(12) United States Patent
Petz et al.

(10) Patent No.: US 10,495,200 B2
(45) Date of Patent: Dec. 3, 2019

(54) DRIVE DEVICE FOR A MOTOR VEHICLE

(71) Applicant: AUDI AG, Ingolstadt (DE)

(72) Inventors: Andreas Petz, Ingolstadt (DE); Roman Straßer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/775,577

(22) PCT Filed: Nov. 10, 2016

(86) PCT No.: PCT/EP2016/077287
§ 371 (c)(1),
(2) Date: May 11, 2018

(87) PCT Pub. No.: WO2017/081165
PCT Pub. Date: May 18, 2017

(65) Prior Publication Data
US 2018/0372198 A1 Dec. 27, 2018

(30) Foreign Application Priority Data

Nov. 14, 2015 (DE) .................. 10 2015 014 814

(51) Int. Cl.
*B60K 6/36* (2007.10)
*F16H 37/08* (2006.01)
(Continued)

(52) U.S. Cl.
CPC .......... *F16H 37/0806* (2013.01); *B60K 6/48* (2013.01); *B60K 6/52* (2013.01); *B60K 6/36* (2013.01);
(Continued)

(58) Field of Classification Search
CPC ..... F16H 37/0806; B60K 6/40; B60K 17/346; B60K 6/52; B60K 6/48; B60K 6/36;
(Continued)

(56) References Cited

U.S. PATENT DOCUMENTS

| 5,533,943 | A  | 7/1996 | Ichioka et al. |
| 6,401,850 | B1 | 6/2002 | Bowen |

(Continued)

FOREIGN PATENT DOCUMENTS

| AT | 514979 A1 | 5/2015 |
| DE | 19919455 C2 | 3/2002 |

(Continued)

OTHER PUBLICATIONS

Search Report dated Aug. 5, 2016 of corresponding German Application No. 102015014814.1; 8 pgs.

(Continued)

*Primary Examiner* — David J Hlavka
(74) *Attorney, Agent, or Firm* — Maier & Maier, PLLC

(57) ABSTRACT

A drive device for a motor vehicle, having at least one first drive assembly, at least one second drive assembly, as well as a differential gearing. An input shaft of the differential gearing can be operatively connected to a drive shaft of the first drive assembly by way of a first gear train and to a drive shaft of the second drive assembly. The drive shaft of the second drive assembly is arranged at an offset relative to an intermediate shaft which is coaxial to the drive shaft of the first drive assembly, and is operatively connected by way of a second gear train to the intermediate shaft, and also by way of the intermediate shaft to the differential gearing.

9 Claims, 1 Drawing Sheet

(51) Int. Cl.
 *B60K 6/48* (2007.10)
 *B60K 6/52* (2007.10)
(52) U.S. Cl.
 CPC ....... *B60Y 2200/92* (2013.01); *B60Y 2300/80* (2013.01)
(58) Field of Classification Search
 CPC .... B60K 2006/4833; B60K 2006/4825; B60Y 2300/80; B60Y 2200/92; Y02T 10/6265; Y02T 10/6252; Y02T 10/6221
 See application file for complete search history.

(56) References Cited

U.S. PATENT DOCUMENTS

| | | | |
|---|---|---|---|
| 8,049,384 B2 | 11/2011 | Wilton et al. | |
| 8,425,375 B2 | 4/2013 | Fukuda | |
| 2014/0135169 A1 | 5/2014 | Rossey et al. | |
| 2014/0335995 A1* | 11/2014 | Swales | B60W 20/00 477/3 |
| 2017/0326964 A1* | 11/2017 | Lahr | B60K 17/346 |
| 2019/0031022 A1* | 1/2019 | Hidaka | B60K 6/365 |
| 2019/0118640 A1* | 4/2019 | Nilsson | B60K 6/365 |

FOREIGN PATENT DOCUMENTS

| | | |
|---|---|---|
| DE | 102005011888 A1 | 11/2005 |
| DE | 102007025954 A1 | 12/2008 |
| DE | 102010023948 A1 | 1/2011 |
| DE | 102010017393 A1 | 12/2011 |
| DE | 102010054871 A1 | 6/2012 |
| DE | 102012021292 A1 | 4/2014 |
| EP | 565893 A2 | 10/1993 |
| EP | 1281559 A1 | 2/2003 |
| EP | 1325828 A1 | 7/2003 |
| EP | 1232891 B1 | 6/2006 |
| EP | 1296440 B1 | 3/2008 |
| FR | 2865867 A1 | 8/2005 |
| GB | 2346124 A | 8/2000 |
| JP | 2013158106 A | 8/2013 |
| JP | 2015171828 A | 10/2015 |

OTHER PUBLICATIONS

International Search Report and Written Opinion dated Feb. 15, 2017 of corresponding Application No. PCT/EP2016/077287; 11 pgs.
Translation of International Preliminary Report on Patentability dated May 24, 2018 of corresponding Application No. PCT/EP2016/077287; 8 pgs.

* cited by examiner

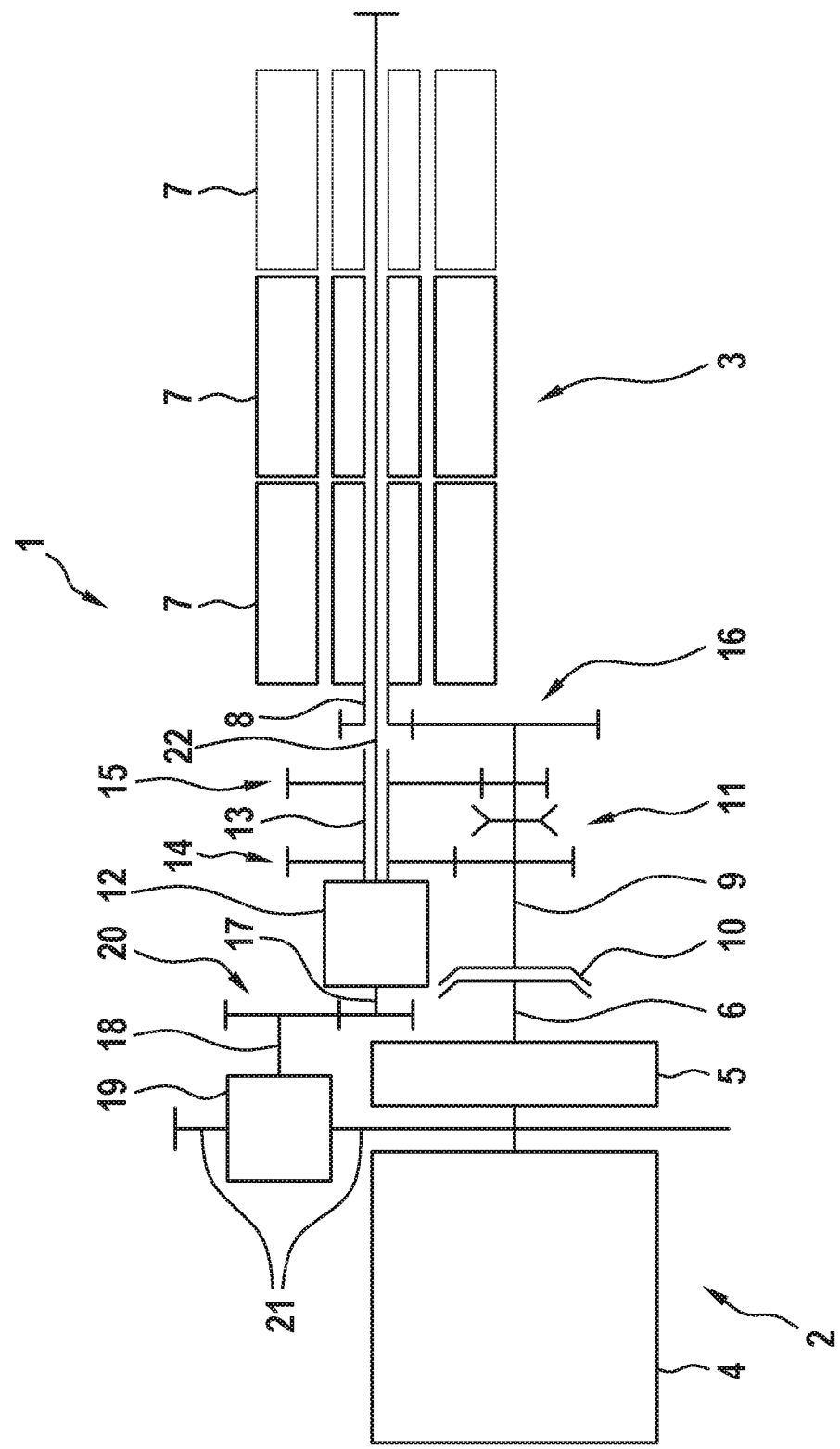

DRIVE DEVICE FOR A MOTOR VEHICLE

FIELD

The invention relates to a drive device for a motor vehicle, having at least one first drive assembly, at least one second drive assembly as well as a differential gearing, wherein an input shaft of the differential gearing can be operatively connected to a drive shaft of the first drive assembly across a first gear train and to a drive shaft of the second drive assembly.

BACKGROUND

The drive device serves for the propelling of the motor vehicle, and thus for providing a torque directed at driving the motor vehicle. The drive device is operatively connected to at least one wheel axle or at least one wheel of the motor vehicle. The drive device comprises several drive assemblies, namely, the first drive assembly and the second drive assembly. The two drive assemblies serve at least temporarily for generating the driving torque provided by the drive device.

The drive shaft of the first drive assembly can be operatively connected to the input shaft of the differential gearing, especially by way of the first gear train. The drive shaft of the second drive assembly can likewise be operatively connected to the input shaft of the differential gearing, but especially preferred, it is rigidly and/or permanently operatively connected to it. In the latter case, accordingly, the first drive assembly is optionally coupled to the differential gearing or its input shaft or decoupled from it, respectively. On the other hand, the second drive assembly is permanently in operative connection with the differential gearing or its input shaft, respectively.

For example, a shift clutch is situated here between the first drive assembly and the differential gearing. The drive device may accordingly generate the drive torque either by means of both the first drive assembly and the second drive assembly or solely with the aid of the second drive assembly. The first drive assembly is present, for example, as an internal combustion engine or it at least comprises such an engine. The second drive assembly, on the other hand, is preferably present in the form of an electric machine or an electric motor.

The differential gearing is designed, for example, as a central differential gearing, i.e., it serves for distributing the driving torque provided by the drive device onto several wheel axles of the motor vehicle, for example, onto a first wheel axle and a second wheel axle, especially onto a front wheel axle and a rear wheel axle. For this purpose, the differential gearing comprises several output shafts, namely one output shaft for each wheel axle driven by way of the differential gearing.

In the usual configurations of the drive device it may be provided that the second drive assembly or its drive shaft, respectively, is arranged coaxially to the drive shaft of the first drive assembly, and that the differential gearing is present at the side of the second drive assembly facing away from the first drive assembly. However, because usually one of the wheel axles, for example, the front wheel axle, is situated in the region of the first drive assembly, in particular, overlapping with it, it is necessary in this case to bridge the distance from the differential gearing up to the corresponding wheel axle with the help of another shaft, the so-called side shaft. This shaft, owing to its position and its high design torque, requires an enclosing housing. Accordingly, the shaft requires a very large packing space. Furthermore, it causes a heavy weight.

The object of the invention is to propose a drive device for a motor vehicle which has advantages when compared to the known drive devices; in particular, it enables a compact, space-saving and lightweight design, which more preferably is modular.

This is accomplished according to the invention with a drive device having the features of claim 1. It is proposed in this case that the drive shaft of the second drive assembly is arranged at an offset relative to an intermediate shaft which is coaxial to the drive shaft of the first drive assembly, and is operatively connected by way of a second gear train to the intermediate shaft and also by way of the intermediate shaft to the differential gearing. Thus, the second drive assembly or its drive shaft, respectively, is not arranged coaxially to the first drive assembly or its drive shaft, but instead at an offset, for example, a parallel offset. It is likewise offset or parallel offset to the intermediate shaft, which for its part is arranged coaxially to the drive shaft of the first drive assembly.

For example, the drive shaft of the first drive assembly is operatively connected or can be operatively connected by way of a shift clutch to the differential shaft. While the first drive assembly is operatively connected or can be operatively connected by way of the first gear train to the differential gearing, the second drive assembly is operatively connected by way of the second gear train to the intermediate shaft and by way of the latter to the differential gearing or its input shaft, preferably in rigid and/or permanent manner. In this respect, the operative connection between the second drive assembly and the differential gearing accordingly is present solely by way of the second gear train and the intermediate shaft.

For example, the first gear train is provided between the intermediate shaft and the input shaft of the differential gearing. In particular, a permanent operative connection is present by way of the first gear train between the intermediate shaft and the input shaft of the differential gearing. In this case, the operative connection of the second drive assembly to the differential gearing likewise is present by way of the first gear train. The torque provided by the second drive assembly is accordingly transmitted by way of the second gear train to the intermediate shaft and from this by way of the first gear train to the input shaft of the differential gearing. As already explained above, this operative connection between the second drive assembly and the differential gearing is preferably permanent.

Such an embodiment of the drive device makes it possible to arrange the differential gearing—looking in the axial direction with respect to a longitudinal center axis of the drive shaft of the first drive assembly or the intermediate shaft—between the first drive assembly and the second drive assembly. The aforementioned additional shaft or side shaft may accordingly be eliminated entirely. In particular, however, no additional housing is needed for such a shaft.

Another embodiment of the invention proposes that a first output shaft of the differential gearing is operatively connected to an input shaft of an axle differential gearing. For example, the first wheel axle of the motor vehicle is operatively connected to the differential gearing or its first output shaft by way of the axle differential gearing. For example, between the first output shaft of the differential gearing and the input shaft of the axle differential gearing there is provided another gear train or a gear stage. The axle differential gearing is arranged preferably in the region of the first drive assembly or overlapping with it—looking in the axial direction of a longitudinal axis of the motor vehicle. For example, it is situated next to the first drive assembly—with respect to the longitudinal axis of the motor vehicle.

Another preferred embodiment of the invention proposes that the second drive assembly is arranged on a side of the differential gearing facing away from the first drive assembly. Such a configuration of the drive device has already been pointed out. In this way, a space-saving design is possible, and in particular no additional shaft, possibly with a housing, is needed to be provided in order to bridge the second drive assembly.

Another embodiment of the invention provides that the drive shaft of the second drive assembly is arranged coaxially to the input shaft of the differential gearing. This means, in particular, that the first gear train and the second gear train bridge the same axle distance. For example, in this case, a smaller transmission ratio is provided between the intermediate shaft and the input shaft than between the intermediate shaft and the drive shaft of the second drive assembly, or vice versa.

An enhancement of the invention provides that a second output shaft of the differential gearing engages through the drive shaft of the second drive assembly, which is designed as a hollow shaft, and/or is mounted therein. The drive shaft of the second drive assembly is present as a hollow shaft. The second output shaft engages through this hollow shaft, preferably entirely. Furthermore, the second output shaft may be mounted in the hollow shaft. Accordingly, the second output shaft of the differential gearing can be viewed entirely as the above described side shaft, since it serves for bridging over the second drive assembly.

Unlike the above-described side shaft, however, the second output shaft requires no separate housing, in particular because it is accommodated in the hollow shaft, so that the hollow shaft represents, figuratively speaking, the housing for the second output shaft. The second output shaft serves preferably for producing an operative connection between the drive device and the second wheel axle, especially the rear axle of the motor vehicle. The described embodiment enables an especially compact and weight-saving arrangement of the individual elements.

In the scope of a preferred enhancement of the invention, it is provided that the input shaft of the differential gearing is designed as a hollow shaft, wherein the second output shaft is arranged in and/or mounted at the input shaft. The second output shaft accordingly engages through the input shaft of the differential gearing, which is preferably formed coaxially to the drive shaft of the second drive assembly. Accordingly, it is more preferably provided that the second output shaft engages through both the input shaft of the differential gearing and the drive shaft of the second drive assembly.

This is possible, in particular, because the input shaft and the drive shaft of the second drive assembly are arranged coaxially to each other. Preferably, furthermore, they have the same internal diameter, so that an arrangement or mounting of the second output shaft in them is possible without anything further. The mounting of the second output shaft may be accomplished, for example, with the aid of at least one bearing, especially a roller bearing.

Another embodiment of the invention provides that the second drive assembly comprises several drive subassemblies. The several drive subassemblies are designed, for example, as electric machines or electric motors. The drive subassemblies are all coupled to the drive shaft of the second drive assembly, especially coupled in rigid and permanent manner. In this way, a modular design of the drive device is achieved, in which the number of drive subassemblies can be chosen in terms of the desired maximum torque of the second drive assembly.

Especially preferred, another embodiment of the invention provides that the several drive subassemblies are identical in design. The drive device may thus be assembled in the manner of a building block system. For example, it is determined which maximum torque the second drive assembly should be able to provide. Next, the necessary number of drive subassemblies is determined for this, from which, together with the dimensions of a single one of the drive subassemblies, the necessary axial dimensions of the drive shaft of the second drive assembly are obtained.

For example, the second drive shaft has an external toothing which can interact with an internal toothing of the drive subassemblies. Accordingly, the necessary number of drive subassemblies is simply based on the drive shaft selected correspondingly in terms of its axial dimensions, so that the external toothing engages with the internal toothing of the drive subassemblies.

Another preferred embodiment of the invention proposes that the second output shaft is operatively connected to a wheel axle of the motor vehicle, on a side of the second drive assembly facing away from the differential gearing, especially by way of another axle differential gearing. As already explained above, the operative connection between the drive device and the wheel axle of the motor vehicle, especially the second wheel axle or the rear wheel axle, should be produced by way of the second output shaft. Preferably, the additional axle differential gearing is situated in the operative connection between the second output shaft and the wheel axle. Accordingly, the latter is likewise arranged on the side of the second drive assembly facing away from the differential gearing or the first drive assembly.

Finally, in another preferred enhancement of the invention, it can be provided that the first gear train is a manual transmission with multiple gears. This makes it possible to produce the operative connection between the intermediate shaft and the input shaft of the differential gearing by way of different transmission ratios, each of the transmission ratios being coordinated with one of the multiple gears. The transmission ratios of the gears may basically be chosen at will, but they are different from each other. For example, the transmission ratios of all gears between the intermediate shaft and the input shaft of the differential gearing are smaller than the transmission ratio between the intermediate shaft and the drive shaft of the second drive assembly.

BRIEF DESCRIPTION OF THE DRAWINGS

The invention shall now be explained more closely with the aid of exemplary embodiments represented in the drawing, without this limiting the scope of the invention. The sole FIGURE shows
a schematic representation of a drive device for a motor vehicle, having at least one first drive assembly and one second drive assembly.

DETAILED DESCRIPTION

The FIGURE shows a schematic representation of a drive device 1 for a motor vehicle. The drive device 1 has a first drive assembly 2 as well as a second drive assembly 3. The first drive assembly 2 is composed, for example, of several drive subassemblies 4 and 5, which are preferably coupled together in a rigid and permanent manner. In particular, the two drive subassemblies 4 and 5 are coupled rigidly and permanently to a drive shaft 6 of the first drive assembly 2.

The drive subassembly 4 for example, is present as an internal combustion engine and the drive subassembly 5 as an electric machine or electric motor. In similar fashion, the second drive assembly 3 may also comprise several drive subassemblies 7; in the exemplary embodiment presented here, there are three drive subassemblies 7. These are coupled in rigid and permanent manner to a drive shaft 8 of the second drive assembly 3, similar to the above discussion. Of course, it may be provided that each of the drive assemblies 2 and 3 comprises only a single one of the drive subassemblies 4 and 5 or 8*. In such case, for example, the first drive assembly 2 itself would be present as an internal combustion engine, while the second drive assembly 3 would be designed as an electric machine or an electric motor.

The drive device 1 furthermore comprises an intermediate shaft 9, which is arranged coaxially to the drive shaft 6 of the first drive assembly 2. Between the drive shaft 6 and the intermediate shaft 9 there is provided a shift clutch 10, by means of which the operative connection can be optionally produced or interrupted between the drive shaft 6 and the intermediate shaft 9. The intermediate shaft 9 is operatively connected or can be operatively connected by way of a first gear train 11 to a differential gearing 12 or its input shaft 13. For example, the first gear train 11 has several gears, which are indicated here by two gear sets 14 and 15.

The drive shaft 8 of the second drive assembly 3 is arranged with an offset in relation to the intermediate shaft 9 and therefore also is offset in relation to the drive shaft 6 of the first drive assembly 2, especially having a parallel offset. It stands in an operative connection, especially a rigid and permanent one, with the intermediate shaft 9 by way of a second gear train 16. Accordingly, an operative connection exists between the second drive assembly 3 by way of the second gear train, the intermediate shaft 9 and the first gear train 11, preferably being likewise rigid and permanent.

The differential gearing 12 has a first output shaft 17. This is operatively connected or coupled to an input shaft 18 of an axle differential gearing 19. The operative connection between the first output shaft 17 and the input shaft 18 preferably occurs by way of a gear stage 20. A first wheel axle 21 is operatively connected to the drive device 1 by way of the axle differential gearing 19. In addition to the first output shaft 17, the differential gearing 12, preferably designed as a central differential gearing, has a second output shaft 22. This serves for producing an operative connection between the drive device 1 and a second wheel axle, not represented here.

It becomes clear that the second output shaft 22 engages through both the input shaft 13 of the differential gearing 12 and the drive shaft 8 of the second drive assembly 3. For this purpose, the input shaft 13 and the drive shaft 8 are designed as hollow shafts. Furthermore, the drive shaft 8 and the input shaft 13 are flush with each other. With such a configuration of the drive device 1, an extremely compact and weight-saving arrangement of the drive assemblies 2 and 3 is possible. In particular, the second drive assembly 3 is situated on a side of the differential gearing 12 away from the first drive assembly 2. Furthermore, the second drive assembly 3, because of its modular construction from the several drive subassemblies 7, can be adapted to diverse requirements. Thus, the provision of a certain maximum torque with the aid of the second drive assembly 3 can be ensured by a corresponding number of the drive subassemblies 7.

The invention claimed is:

1. A drive device for a motor vehicle, comprising:
at least one first drive assembly, at least one second drive assembly, as well as a differential gearing, wherein an input shaft of the differential gearing can be operatively connected to a drive shaft of the first drive assembly by way of a first gear train and to a drive shaft of the second drive assembly, wherein the drive shaft of the second drive assembly is arranged at an offset relative to an intermediate shaft which is coaxial to the drive shaft of the first drive assembly, and is operatively connected by way of a second gear train to the intermediate shaft and also by way of the intermediate shaft to the differential gearing, wherein a first output shaft of the differential gearing is operatively connected to an input shaft of an axle differential gearing.

2. The drive device according to claim 1, wherein the second drive assembly is arranged on a side of the differential gearing facing away from the first drive assembly.

3. The drive device according to claim 1, wherein the drive shaft of the second drive assembly is arranged coaxially to the input shaft of the differential gearing.

4. The drive device according to claim 1, wherein a second output shaft of the differential gearing engages through the drive shaft of the second drive assembly, which is designed as a hollow shaft, and is mounted therein.

5. The drive device according to claim 4, wherein the input shaft of the differential gearing is designed as a hollow shaft, wherein the second output shaft is arranged at and mounted in the input shaft.

6. The drive device according to claim 1, wherein the second drive assembly has several drive subassemblies.

7. The drive device according to claim 6, wherein the several drive subassemblies are identical in design.

8. The drive device according to claim 4, wherein the second output shaft is operatively connected to a wheel axle of the motor vehicle at a side of the second drive assembly facing away from the differential gearing, especially by way of another axle differential gearing.

9. The drive device according to claim 1, wherein the first gear train is a manual transmission with multiple gears.

* * * * *